United States Patent [19]

Ashlock et al.

[11] Patent Number: 4,500,669

[45] Date of Patent: Feb. 19, 1985

[54] TRANSPARENT, ABRASION RESISTANT COATING COMPOSITIONS

[75] Inventors: L. T. Ashlock, Lake Forest; Harold Mukamal, Seal Beach; William H. White, La Puente, all of Calif.

[73] Assignee: Swedlow, Inc., Garden Grove, Calif.

[21] Appl. No.: 136,757

[22] Filed: Apr. 3, 1980

Related U.S. Application Data

[63] Continuation of Ser. No. 845,915, Oct. 27, 1977, abandoned.

[51] Int. Cl.$^3$ .......................... C08K 3/08; C08L 83/06
[52] U.S. Cl. ................................ 524/440; 106/287.12; 106/287.14; 106/287.16; 524/439; 524/441; 524/837; 524/858; 524/863
[58] Field of Search .................. 428/451, 539, 412; 260/29.2 M; 106/287.12, 287.14, 287.16; 524/459, 440, 441, 837

[56] References Cited

U.S. PATENT DOCUMENTS

| | | | |
|---|---|---|---|
| 2,568,384 | 9/1951 | Cheronis | 260/29.2 M |
| 3,435,001 | 3/1969 | Merrill | 260/465 |
| 3,451,838 | 6/1969 | Burzynski et al. | 117/333 |
| 3,817,905 | 6/1974 | Lerner et al. | 106/1.17 |
| 3,894,881 | 7/1975 | Suzuki et al. | 106/287.16 |
| 3,955,035 | 5/1976 | Ito et al. | 428/451 |
| 3,976,497 | 8/1976 | Clark | 106/287.12 |
| 3,986,997 | 10/1976 | Clark | 260/29.1 SB |
| 4,084,021 | 4/1978 | Sandvig | 427/44 |
| 4,097,287 | 6/1978 | Ito et al. | 106/14.14 |
| 4,159,206 | 6/1979 | Armbruster et al. | 106/287.12 |
| 4,170,690 | 10/1979 | Armbruster et al. | 428/447 |
| 4,177,315 | 12/1979 | Ubersax | 428/336 |
| 4,188,451 | 2/1980 | Humphrey | 428/331 |
| 4,218,354 | 8/1980 | Hayati et al. | 260/29.2 M |

FOREIGN PATENT DOCUMENTS

| | | |
|---|---|---|
| 2322909 | 1/1977 | France . |
| 2383220 | 6/1978 | France . |
| 52-154837 | 12/1977 | Japan . |
| 53-2539 | 1/1978 | Japan . |
| 1147518 | 4/1969 | United Kingdom . |

OTHER PUBLICATIONS

Sneed et al., "Comprehensive Inorganic Chemistry", vol. 7, D. Van Nostrand Co., Inc., 1958, p. 72.
"Webster's New Collegiate Dictionary", G. & C. Merriam Co., 1960, p. 24.

Primary Examiner—Allan M. Lieberman
Attorney, Agent, or Firm—Lyon & Lyon

[57] ABSTRACT

There is disclosed transparent, abrasion resistant coating compositions comprising a colloidal dispersion of a water insoluble dispersant in a water-alcohol solution of the partial condensate of silanol wherein the dispersant comprises metals, alloys and salts thereof.

18 Claims, No Drawings

TRANSPARENT, ABRASION RESISTANT COATING COMPOSITIONS

This is a continuation of application Ser. No. 845,915, filed 10-27-77 and now abandoned.

BACKGROUND OF THE INVENTION

The present invention relates to coating compositions and in particular, relates to protective coating compositions for polymeric materials.

In recent year, synthetic polymeric materials have been utilized in a wide variety of applications. Transparent polymeric materials have been utilized as windows in aircraft and public buildings. Further, transparent polycarbonates and acrylics have been utilized in glazing for automobiles, buses and aircraft. Although these transparent polymers may be readily fabricated into the desired shape, unfortunately they have relatively low abrasion resistance. The prior method of enabling the use of these transparent polymers involves coating the surface of the polymers with a transparent, abrasion resistant coating. Prior coating such as silica-containing solutions and polysilicic acid fluorinated copolymer have been utilized. Unfortunately, these coatings are difficult to apply, have a low humidity resistance or are expensive.

Another prior coating composition is disclosed in the Clark U.S. Pat. No. 3,986,997. The Clark composition comprised a colloidal dispersion of silica in a water-alcohol solution of the partial condensate of silanol. Although the Clark composition is suitable in some applications, in other application, additional hardness, elongation and static dissipation was desired to enable the formation of a more suitable coating. Thus, a coating having an improved hardness, elongation and static dissipating capability is still desired.

SUMMARY OF THE INVENTION

It is therefore an object of the present invention to provide an improved abrasion resistant coating composition. It is a further object of the present invention to provide a coating composition having improved elongation and static dissipating capabilites.

This and other objects and advantages are obtained by forming a transparent, abrasion resistant coating comprising a colloidal dispersion of a water insoluble dispersant in a water-alcohol solution of the partial condensate of silanol. The insoluble dispersant is preferably a metal, metal alloy or metal salt that can be converted into a colloidal dispersion and is stable in the pH range of about 3 to 6. The silanol preferably has the formula $R(Si(OH)_3)$ where R is an organic radical such as a lower alkyl or vinyl, methoxyethyl, phenyl, $\gamma$-glycidoxy propyl or $\gamma$-methacryloxypropyl radical. Preferably, the partial condensate contains at least 30% by weight methyl silanol.

A more thorough disclosure of the objects and the advantages of the present invention is presented in the detailed description which follows.

DETAILED DESCRIPTION OF THE INVENTION

The present invention contemplates the formation of a transparent, abrasion resistant coating comprising a colloidal dispersion of a water insoluble dispersant in a water-alcohol solution of the partial condensate of silanol.

The insoluble dispersants are preferably a metal, metal alloy or metal salt which can be dispersed in the water alcohol solution of the partial condensate of silanol to form a colloidal dispersion. Suitable metals are antimony, aluminum, gold, silver, copper, tin, cadmium, and indium. Suitable alloys are mixtures of the above metals such as tin-antimony, tin-indium and tin-cadmium alloys. Suitable metal salts are oxides, nitrides, phosphates, sulfides, hydroxides or acetates of the above metals and alloys such as antimony oxide, aluminum oxide, aluminum acetate, tin-antimony oxides, cadmium stannate and indium-tin oxide. However, it will be obvious to one skilled in the art that other water insoluble metals, metal alloys and metal salts which can be dispersed in a water-alcohol solution of the partial condensate of silanol to form a colloidal dispersion, are stable in the pH range of about 3 to about 6, and do not alter the silicone cure reaction or coating stability would also be suitable in the practice of the present invention.

In some cases, the dispersants of the present invention may be opaque. Suitable opaque dispersants preferably have a particle size small enough to avoid appreciable scattering of visible light thereby preventing the formation of a translucent or pigmented coating. Preferably, if the dispersant has a refractive index of about 1.5, the average colloidal particle size should be about 200 angstroms, whereas if the refractive index is 2.0 or greater, the average colloidal particle size should be about 100 angstroms or less.

The colloidal dispersants function to improve the hardness and the elongation properties of the coating. Further, certain colloidal metals, metal alloys and metal salts such as copper, gold, silver, tin-antimony oxides, cadmium stannate and indium tin oxide also provide improved static dissipating properties.

The partial consensate preferably comprises trisilanols having the formula $R(Si(OH)_3)$ wherein R is a low molecular weight, short chain organic radical and is preferably selected from the group of radicals consisting of lower alkyl or vinyl ($C_1$–$C_4$), methoxyethyl, phenyl, $\gamma$-glycidoxy propyl or $\gamma$-methacryloxypropyl. The organic radical functions to enable the formation of the polymeric coating. However, larger organic radicals hinder the crosslinking of the silanol and result in a softer coating. The partial condensate is preferably comprised of at least about 30% by weight methyl trisilanol and most preferably 100% by weight methyl trisilanol.

The partial condensate may also comprise mixtures of trisilanols and disilanols. The partial condensate comprising a mixture of tri and disilanols forms coatings having increased flexibility and decreased hardness. Therefore, it is preferred that the mixture comprise at least about 80% by weight of the trisilanol to form a coating having a suitable hardness.

The silanols are preferably generated in situ by the hydrolysis of the corresponding alkoxysilane in an aqueous dispersion of the insoluble dispersant. Suitable alkoxysilanes have alkoxy substituents such as methoxy, ethoxy, isopropoxy, methoxyethoxy t-butoxy and acetoxy which, upon the hydrolysis of the silane, form the corresponding alcohol or acid. Upon the formation of the silanol in the acidic aqueous medium, a portion of the silicon-bonded hydroxyl groups of the silanol are condensed to form silicon-oxygen-silicon bonds. However, the silanol is only partially condensed and retains a portion of the silicon-bonded hydroxyl groups to render the polymer soluble in the water-alcohol solvent. The partial condensate can be characterized as having at least one silicone-bonded hydroxyl group for every three silicon-oxygen-silicon bonds. When the coating is cured, the remaining hydroxyl groups condense to form a selsesquioxane, $RSiO_3/2$.

The coating composition of the present invention is preferably prepared by dispersing the dispersant in an aqueous or aqueous-alcohol solution to form a hydrosol. Suitable alcohols are lower aliphatic alcohols such as methanol, ethanol, propanol and isopropanol. However, it will be obvious to one skilled in the art that other alcohols may also be utilized in the practice of the present invention. The hydrosol is then added to a solution of the alkoxysilane in acid. The solution of alkoxysilane contains a sufficient amount of acid so that the resulting mixture preferably has a pH from about 3 to about 6. At lower or higher pH, the dispersant tends to precipitate out from solution. The acid is preferably an organic acid such as acetic, chloroacetic, formic, and dimethylmalonic because they evaporate readily when the coating is dried and they enhance adhesion of the coating to the substrate. Other suitable organic and inorganic acids are disclosed in the Clark U.S. patent, supra, the disclosure of which is incorporated herein by reference.

In a short time after the hydrosol and alkoxysilane solution are mixed together, substantially all of the alkoxysilane is hydrolyzed to form the corresponding silanol and alcohol. A portion of the silanol is then condensed to form the partial condensate. It is preferred that the mixture contain enough alcohol to form a water-alcohol co-solvent system having from about 20% to about 75% by weight alcohol to insure the solubility of the partial condensate. Additional alcohol or another polar solvent such as acetone may be added to the mixture to form a suitable solvent system.

Preferably, the coating composition contains from about 10% to about 50% solids and the solids consist of about 10% to about 70% of the colloidal dispersant, and about 30% to about 90% of the partial condensate. However, it will be appreciated by those skilled in the art that the amount of solids in the coating and the composition of the solids may vary over a wide range depending upon the desired properties of the coating.

Preferably, a latent condensation catalyst is added to the coating composition to enable curing of the coating composition under milder conditions to form the hard, abrasion resistant coating. Preferably a sufficient amount of the catalyst is added to the composition to comprise about 0.1% to about 1% by weight of the composition. Suitable condensation catalysts for the present invention are choline acetate and sodium acetate. Other suitable condensation catalysts are disclosed in the Clark patent.

The coating composition of the present invention has stable shelf life of about six months to one year. The composition can be readily applied to a variety of substrates such as glass, polycarbonates, acrylics, etc. by methods well known to the art skilled such as flow, spray or dip coating. Then the coating composition is cured at temperatures of about 65° to about 130° depending on the stability of the substrate for a period of time from about 1 to about 24 hours depending on the temperature to complete the condensation reaction and form the transparent abrasion resistant coating of the present invention. The coating preferably has a thickness of about 1 to about 20 microns.

The following examples illustrate the present invention. The physical properties of the coating compositions of the present invention were compared to the physical properties of a coating formed according to the teachings of the Clark patent. The compositions of the present invention were formed as follows Composition I An antimony oxide colloidal dispersion in methyl silanol was made by reacting 18.0 grams of the oxide with a mixture of 18.0 grams of trimethoxy methyl silane and 1.3 grams of glacial acetic acid. The temperature was maintained from about 0° C. to 10° C. 31.6 grams of 2-propanol was then added to the solution. The mixture was allowed to digest for a period of about 48 hours and then 16.0 grams of 2-propanol, 12.6 grams of butanol and 0.9 grams of a 10% choline acetate solution in 2-propanol was added to the mixture. The mixture was then filtered and coated onto an acrylic substrate by flow film application. The coating was then dried to a tack-free condition at about 40% humidity at about 20° C. and cured at about 85° C. to 95° C. for about two hours.

Composition II

A dispersion comprising 208 grams of basic aluminum acetate in 312 grams distilled water was added to 2000 grams of isopropyl alcohol with constant stirring at a temperature of about 5° C. to 10° C. Then, 250 grams of methyl trimethoxy silane was added slowly with stirring to the mixture while maintaining the reaction temperature. After one hour of stirring, 142 grams of isopropyl alcohol and 0.9 grams of a 10% choline acetate solution in 2-propanol was added to the mixture and the mixture was stirred for another hour. The product was filtered through a 1.2 micron filter using diatomaceous earth as a filtering aid. The composition was coated on acrylic as 26% solid by flow film application. The coating was then dried to a tack free condition at about 40% humidity at about 20° C. and cured for four hours at 87° C.

The coated parts were tested for light transmission and haze using ASTM C-1003; taber abrasion using ASTM D-1044 (500 gms, 100 rev.), and adhesion and Elongation-Flexibility as follows:

Adhesion:
  Cross-hatch scribes are made on the surface of samples of the coated parts and 3M-600 cellophane tape is then affixed to the surface. The tape is then pulled away from the surface to remove the coating. The number of unaffected squares determines the percentage of adhesion of the coating to the substrate.

Elongation-Flexibility:
  Samples of the coated material having dimensions of one inch by ten inches are wrapped around mandrels having decreasing diameters from 84 inches to 8 inches. Each sample is then inspected with high intensity lamps to determine coating failure as evidenced by perpendicular cracking across the coating.

The Percent Elongation is then calculated as follows:

$$E = \frac{100 \times \frac{T}{2}}{R}$$

-continued

T = thickness of sample
R = radius of mandrel at which coating failed.

The results of the test are as follows:

|  | Clark Coating | Composition I | Composition II |
|---|---|---|---|
| Light Transmission, % | 93.9 | 92.0 | 93.2 |
| Haze, % | 0.2 | 0.08 | 0.25 |
| Taber Abrasion, % delta haze | 2.5 | 0.7 | 1.0 |
| Flexed Elongation | 1.0 | 1.5 | 1.0 |
| Adhesion % | 100 | 100 | 100 |

From the above data, it can be seen that the coating composition of the present invention exhibits improved taber abrasion resistance and elongation. Further, the coating exhibits suitable adhesion to the substrates.

While embodiments and applications of this invention have been shown and described, it will be apparent to those skilled in the art that many more modifications are possible without departing from the inventive concepts herein described. The invention, therefore, is not to be restricted except as is necessary by the prior art and by the spirit of the appended claims.

We claim:

1. A coating composition which forms a transparent, abrasion-resistant coating upon curing, said coating composition consisting essentially of an effective abrasion-resisting amount of a colloidal dispersion of a water insoluble dispersant in a water-alcohol solution of the partial condensate of $R\ Si(OH)_3$ where R is an organic radical, and said dispersant is a metal or a metal alloy selected from the group consisting of antimony, aluminum, gold, silver, copper, tin, cadmium, indium and mixtures thereof.

2. The coating composition of claim 1 wherein said organic radical is selected from the group consisting of $C_1$–$C_4$ alkyl and vinyl, methoxyethyl, $\gamma$-glycidoxypropyl and $\gamma$-methacryloxypropyl.

3. The coating composition of claim 1 wherein said partial condensate contains at least 30 percent by weight methyl trisilanol.

4. The coating composition of claim 1 wherein said partial condensate contains 100 percent by weight methyl trisilanol.

5. The coating composition of claim 1 wherein said composition additionally includes a latent condensation catalyst.

6. The coating composition of claim 5 wherein said catalyst is choline acetate.

7. The coating composition of claim 1 wherein the alcohol in the water-alcohol solution is a lower aliphatic alcohol.

8. A coating composition which forms a transparent, abrasion-resistant coating upon curing, said coating composition consisting essentially of an effective abrasion resisting amount of a colloidal dispersion of a water insoluble dispersant in a water-alcohol solution of the partial condensate of a mixture of $R\ Si(OH)_3$ and $R_2\ Si(OH)_2$ wherein R is an organic radical, and said dispersant is a metal or a metal alloy selected from the group consisting of antimony, aluminum, gold, silver, copper, tin, cadmium, indium and mixtures thereof.

9. The coating composition of claim 1 wherein said dispersant has a partial size of less than about 200 angstroms.

10. The coating composition of claim 1, wherein said partial condensate contains at least 30 percent by weight of $CH_3Si\ (OH)_3$.

11. The coating composition of claim 1 wherein said dispersant is antimony or an alloy containing antimony.

12. The coating composition of claim 1 wherein said dispersant is aluminum or an alloy containing aluminum.

13. The coating composition of claim 1 wherein said dispersant is gold or an alloy containing gold.

14. The coating composition of claim 1 wherein said dispersant is silver or an alloy containing silver.

15. The coating composition of claim 1 wherein said dispersant is copper or an alloy containing copper.

16. The coating composition of claim 1 wherein said dispersant is tin or an alloy containing tin.

17. The coating composition of claim 1 wherein said dispersant is cadmium or an alloy containing cadmium.

18. The coating composition of claim 1 wherein said dispersant is indium or an alloy containing indium.

* * * * *

UNITED STATES PATENT AND TRADEMARK OFFICE
CERTIFICATE OF CORRECTION

PATENT NO. : 4,500,669

DATED : February 19, 1985

INVENTOR(S) : LYSANDER T. ASHLOCK, et al.

It is certified that error appears in the above—identified patent and that said Letters Patent is hereby corrected as shown below:

Column 2, line 37, "consensate" should read --condensate--.

Column 4, line 27, "2000" should read --200--

Signed and Sealed this

Fourth Day of July, 1989

Attest:

*Attesting Officer*

DONALD J. QUIGG

*Commissioner of Patents and Trademarks*